United States Patent
Avery et al.

(10) Patent No.: US 8,360,155 B2
(45) Date of Patent: Jan. 29, 2013

(54) EQUALIZER STOPPLE FITTING WITH INTEGRAL PRESSURE EQUALIZATION FITTING

(75) Inventors: Fred L. Avery, Spring, TX (US); Bruce E. Morris, Houston, TX (US)

(73) Assignee: Quality Connector Systems, Houston, TX (US)

( * ) Notice: Subject to any disclaimer, the term of this patent is extended or adjusted under 35 U.S.C. 154(b) by 1050 days.

(21) Appl. No.: 12/205,621

(22) Filed: Sep. 5, 2008

(65) Prior Publication Data

US 2010/0059987 A1 Mar. 11, 2010

(51) Int. Cl.
*E21B 1/12* (2006.01)

(52) U.S. Cl. ........ 166/339; 166/337; 166/336; 166/344; 166/347

(58) Field of Classification Search ............. 166/205.02, 166/250.04, 250.17, 336, 337, 339, 344, 166/347, 351; 285/100, 101, 103–105, 109, 285/197–199, 373
See application file for complete search history.

(56) References Cited

U.S. PATENT DOCUMENTS

| | | | |
|---|---|---|---|
| 2,291,143 A | 7/1942 | Brown et al. | |
| 2,306,102 A | 12/1942 | Penick et al. | |
| 2,775,469 A * | 12/1956 | Brown et al. | ................... 285/18 |
| 3,475,041 A | 10/1969 | Mesko | |
| 3,713,675 A | 1/1973 | White, Jr. | |
| 3,860,270 A | 1/1975 | Arnold | |
| 3,954,288 A | 5/1976 | Smith | |
| 4,127,289 A | 11/1978 | Daspit | |
| 4,290,632 A | 9/1981 | Manchester et al. | |
| 4,330,143 A | 5/1982 | Reneau | |
| 5,312,137 A | 5/1994 | Nee | |
| 5,590,913 A | 1/1997 | Morris et al. | |
| 6,200,068 B1 * | 3/2001 | Bath et al. | ................... 405/184.1 |
| 7,216,795 B2 * | 5/2007 | Garrison et al. | ............... 228/212 |
| 7,650,944 B1 * | 1/2010 | Boyle | ............................ 166/344 |
| 2005/0104375 A1 * | 5/2005 | Thompson | .................... 285/342 |
| 2006/0027627 A1 * | 2/2006 | Garrison et al. | ............. 228/101 |
| 2006/0065320 A1 * | 3/2006 | Borland et al. | .................. 138/99 |

OTHER PUBLICATIONS

T.D. Williamson, Inc. STOPPLE® Fittings web product page (www.tdwilliamson.com/hottaptdw/fittings/stopplefit_plus.html), date unknown; 1 page.

(Continued)

*Primary Examiner* — Carlos Lugo
*Assistant Examiner* — Aaron Lembo
(74) *Attorney, Agent, or Firm* — Meyertons, Hood, Kivlin, Kowert & Goetzel, P.C.; Eric B. Meyertons (57) ABSTRACT

A fitting includes a body having at least two portions coupled together to form a body having a passage through the body. The passage allows at least a portion of a conduit to be located at least substantially lengthwise within the body. First and second ports are located on the body and are in fluid communication with the passage. A first seal is located on the passage wall between a first end of the body and the first port. A second seal is located on the passage wall between the first port and the second port. A translatable ring is located on the passage wall between the first and second seals. The ring moves along the passage wall when the first seal is activated so that the second seal is activated. The ring includes an opening proximate the first port to provide access to the conduit from the first port. The first and second seals provide a seal in the passage.

20 Claims, 10 Drawing Sheets

OTHER PUBLICATIONS

T.D. Williamson, Inc. STOPPLE® Procedure Options web product page (www.tdwilliamson.com/hottaptdw/ServBro/serv_stopploprocdOpt.html), date unknown; 1 page.

T.D. Williamson, Inc. Line Plugging & Stopping web product page (http://www.tdwilliamson.com/hottaptdw/ServBro/line_plugstop.html), date unknown; 1 page.

T.D. Williamson, Inc. Line Plugging & Completion Plug Systems web product page (http://www.tdwilliamson.com/hottaptdw/ServBro/plugging_completionsytm.html), date unknown; 1 page.

T.D. Williamson, Inc. Typical Tapping Procedure web product page (http://www.tdwilliamson.com/hottaptdw/ServBro/serv_HotWetColdTap.html), date unknown; 1 page.

T.D. Williamson, Inc. Leak Repair Clamp web product page (http://www.tdwilliamson.com/hottaptdw/Rehab_Products/clamp_repair_sleeve.html), date unknown; 1 page.

U.S. Patent and Trademark Office, "Office Communication," for U.S. Appl. No. 12/205,611 mailed May 28, 2010.

U.S. Patent and Trademark Office, "Office Communication," for U.S. Appl. No. 12/205,628 mailed May 28, 2010.

U.S. Patent and Trademark Office, "Office Communications" for U.S. Appl. No. 12/205,611 mailed Dec. 10, 2010.

U.S. Patent and Trademark Office, "Office Communications" for U.S. Appl. No. 12/205,628 mailed Mar. 7, 2011 and Sep. 28, 2011.

\* cited by examiner

EQUALIZER STOPPLE FITTING WITH INTEGRAL PRESSURE EQUALIZATION FITTING

BACKGROUND

1. Field of the Invention

The present invention relates to subsea pipelines and connectors and/or fittings used in the pipelines. In particular, the invention relates to a subsea fitting that clamps around a portion of a subsea pipeline and provides internal pressure-sealed regions inside the fitting.

2. Description of Related Art

Subsea pipelines are used to transport oil and gas to shore from offshore platforms and other pipeline systems. During use of the pipeline, the pipeline flow in a specific line may need to be interrupted or "plugged" internally to prevent loss of product to the subsea environment during maintenance and/or repair operations on the pipeline. Typically, a mechanical bolt-on split sleeve hot tap fitting and tapping valve are placed on the pipeline. A "hot tap" machine is then used to cut a hole in the pipeline within the pressure-containing confines of the mechanical bolt-on split-sleeve hot tap fitting and tapping valve. After the tap is completed, a plugging machine is mounted to the tapping valve and used to install a temporary plugging head into the pipeline. The plugging head blocks the flow of the product in the pipeline to allow the pipeline operator to cut or otherwise modify the pipeline downstream from the plugging head without emission of any pipeline product. However, before cutting the pipeline, all remaining product in the isolated downstream section of the line is drained through a separate hot tap fitting (typically, a 2" hot tap fitting). The separate hot tap fitting is typically of the same design as the plugging hot tap fitting.

After the completion of the required maintenance and/or repair operations, the operator restores flow in the pipeline by retracting the head of the plugging machine from the interior of the pipeline. However, because of the design of the plugging head, the plugging head cannot be removed against a differential pressure. Therefore, pressure is introduced through the separate hot tap fitting (the 2" hot tap fitting) to equalize pressure on both sides of the plugging head to permit retraction of the plugging head. Thus, the separate hot tap fitting is used for both draining excess product and equalizing pressure prior to removal of the plugging head.

Currently, the separate hot tap fitting is a totally separate fitting from the plugging hot tap fitting. Thus, two separate installations are required to install the separate hot tap fitting and plugging hot tap fitting. To avoid using multiple fittings and to reduce installation costs, a unique subsea fitting is proposed that integrates the separate hot tap fitting and the plugging hot tap fitting into a single fitting. The elimination of the separate hot tap fitting may reduce the costs (e.g., costs associated with equipment, surface vessels, manned diving operations, and the like) and significantly reduce the time required to install multiple fittings subsea.

Currently, separate fittings are used to provide bypass and plugging functions on a subsea pipeline. One fitting may be used to allow insertion of the plugging head into the pipeline while another fitting upstream of the plugging head is used to divert fluid flow into a bypass line. Proposed is a unique subsea fitting that may be able to provide both the bypass and plugging functions in a single fitting. The single fitting eliminates separate fittings for connection to the bypass line and insertion of the plugging head.

Clamp fittings are typically used to seal off a portion of a subsea pipeline, for example, when the pipeline begins to leak in a certain location. Installation of the clamp fittings can be time consuming and costly. Proposed is a simplified clamp fitting that reduces the number of steps needed to install the clamp fitting and may reduce equipment costs and installation costs associated with installing the clamp fitting.

SUMMARY

In certain embodiments, a fitting includes a body having at least two portions coupled together to form a body having a passage through the body. The passage allows at least a portion of a conduit to be located at least substantially lengthwise within the body. First and second ports are located on the body and are in fluid communication with the passage. A first seal is located on the passage wall between a first end of the body and the first port. A second seal is located on the passage wall between the first port and the second port. A translatable ring is located on the passage wall between the first and second seals. The ring moves along the passage wall when the first seal is activated so that the second seal is activated. The ring includes an opening proximate the first port to provide access to the conduit from the first port. The first and second seals provide a seal in the passage.

In certain embodiments, a method of plugging and draining a portion of a subsea pipeline includes coupling together at least two body portions to form a body having a passage through the body. The passage at least partially surrounds at least a portion of the subsea pipeline at least substantially lengthwise within the body. The method also includes securing the body to the subsea pipeline and activating a first seal located on the passage wall between a first end of the body and a first port located on the body. The first port is in fluid communication with the passage. Further, the method includes activating a second seal located on the passage wall between the first port and a second port located on the body. The second port is in fluid communication with the passage. Activating the second seal includes translating a ring located on the passage wall between the first and second seals. Translating the ring includes moving the ring along the passage wall when the first seal is activated so that the second seal is activated. The method also includes tapping into the subsea pipeline through the second port and plugging flow in the subsea pipeline with a plugging head inserted through the second port, and removing fluids from the subsea pipeline through the first port.

In certain embodiments, a fitting includes a body having at least two portions coupled together to form the body having a passage through the body. The passage allows at least a portion of a conduit to be located at least substantially lengthwise within the body. First and second ports are located on the body and are in fluid communication with the passage. A first seal is located on the passage wall between a first end of the body and the ports. A second seal is located on the passage wall between a second end of the body and the ports. The first and second seals provide a seal between the outside wall of the conduit and the inside wall of the body. A channel is formed in the body to allow fluid flow at least partially circumferentially in the body between the first port and the second port.

In certain embodiments, a method of installing a bypass fitting onto a portion of a subsea pipeline includes coupling together at least two body portions to form a body having a passage through the body. The passage at least partially surrounds at least a portion of the subsea pipeline at least substantially lengthwise within the body. The method also includes securing the body to the subsea pipeline and activating a first seal located on the passage wall between a first end of the body and a first port and a second port located on the body. The ports are in fluid communication with the passage. Further, the method includes activating a second seal located on the passage wall between a second end of the body and the ports, tapping into the subsea pipeline through the first port, plugging flow in the subsea pipeline with a plugging head inserted through the first port, and allowing fluid from inside the conduit to flow at least partially circumferentially around the outside of the conduit from the first port to the second port through a channel formed in the body between the first port and the second port.

In certain embodiments, a fitting includes a body having at least two portions coupled together to form the body having a passage through the body. The passage allows at least a portion of a conduit to be located at least substantially lengthwise within the body. A first seal is located on the passage wall proximate a first end of the body. A second seal is located on the passage wall proximate a second end of the body. A translatable ring is located on the passage wall between the first and second seals. The ring moves along the passage wall when the first seal is activated so that the second seal is activated. The first and second seals provide a seal in the passage.

In certain embodiments, a method of installing a clamp fitting over a portion of a subsea pipeline includes coupling together at least two body portions to form a body having a passage through the body. The passage at least partially surrounds at least a portion of the subsea pipeline at least substantially lengthwise within the body. The method also includes securing the body to the subsea pipeline, activating a first seal located on the passage wall proximate a first end of the body, and activating a second seal located on the passage wall proximate a second end of the body. Activating the second seal includes translating a ring located on the passage wall between the first and second seals. Translating the ring includes moving the ring along the passage wall when the first seal is activated to activate the second seal.

BRIEF DESCRIPTION OF THE DRAWINGS

Features and advantages of the methods and apparatus of the present invention will be more fully appreciated by reference to the following detailed description of presently preferred but nonetheless illustrative embodiments in accordance with the present invention when taken in conjunction with the accompanying drawings in which.

While the invention is susceptible to various modifications and alternative forms, specific embodiments thereof are shown by way of example in the drawings and will herein be described in detail. The drawings may not be to scale. It should be understood that the drawings and detailed description thereto are not intended to limit the invention to the particular form disclosed, but to the contrary, the intention is to cover all modifications, equivalents and alternatives falling within the spirit and scope of the present invention as defined by the appended claims.

DETAILED DESCRIPTION OF EMBODIMENTS

In the context of this patent, the term "fitting" means a fitting or connector that may be coupled into a pipeline (e.g., a subsea pipeline, slurry pipeline, or solid transport pipeline). Fittings may include, but not be limited to, valves, diverters, wye-shaped fittings, piggable fittings, and measurement devices. The term "coupled" means either a direct connection or an indirect connection (e.g., one or more intervening connections) between one or more objects or components. The phrase "directly connected" means a direct connection between objects or components such that the objects or components are connected directly to each other so that the objects or components operate in a "point of use" manner.

Figure 1:
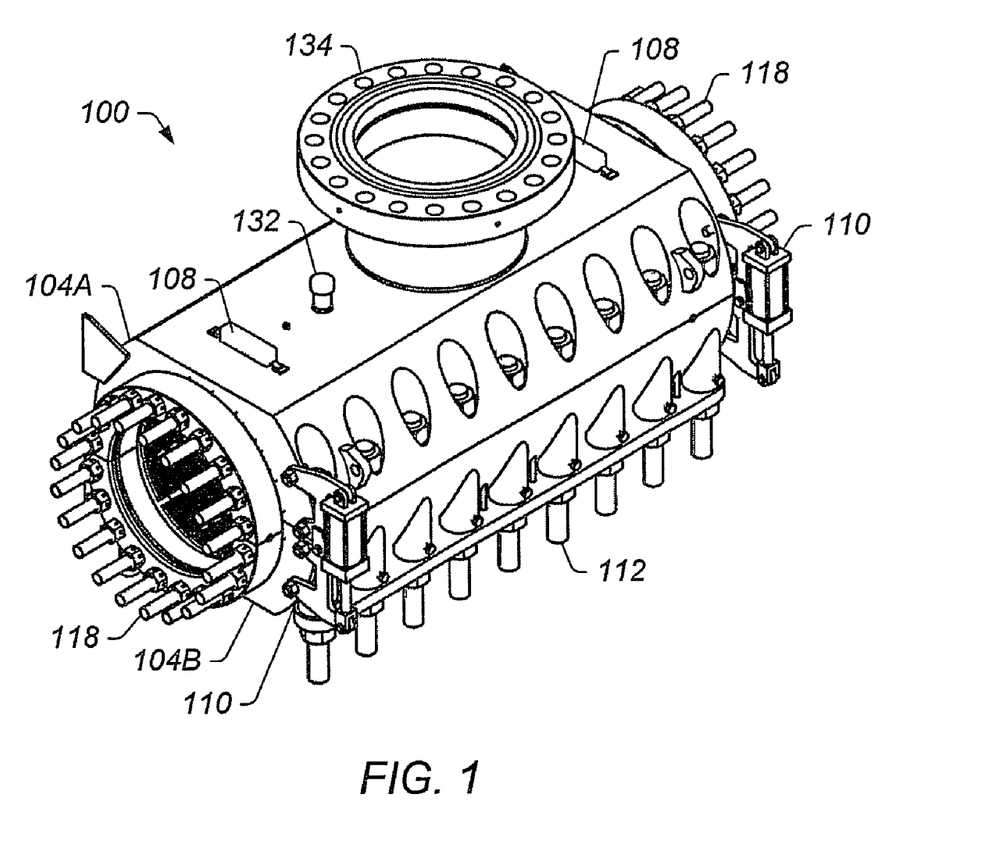
FIG. 1 depicts an isometric view of an embodiment of a fitting.
Figure 2:
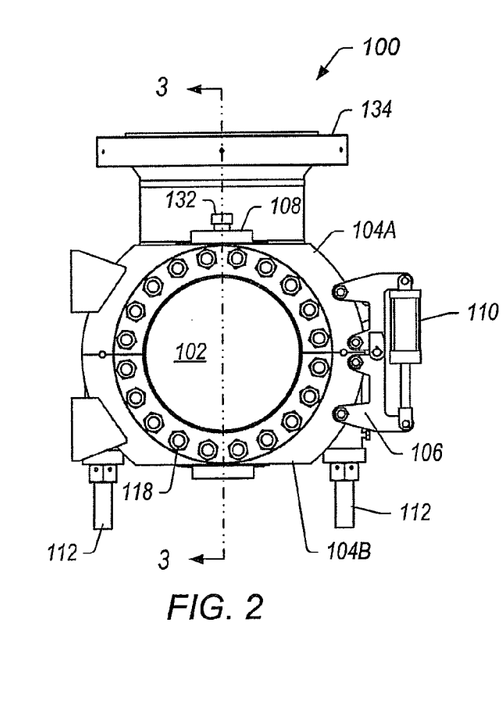
FIG. 2 depicts an end view of a fitting.
Figure 3:
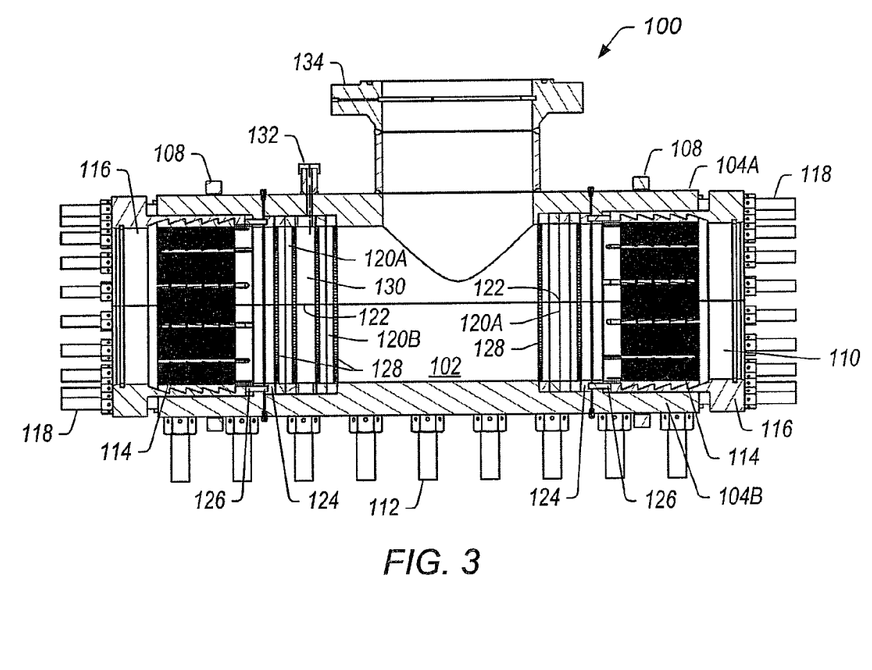
FIG. 3 depicts a cross-sectional view of a fitting.

FIG. 1 depicts an isometric view of an embodiment of fitting 100. FIG. 2 depicts an end view of fitting 100. FIG. 3 depicts a cross-sectional view of fitting 100. Fitting 100 may be made from materials such as, but not limited to, carbon steel, stainless steel, titanium, or aluminum. In some embodiments, fitting 100 is a single piece forged or cast from any of the above listed materials. In some embodiments, fitting 100 is constructed by welding fabrication of plates, tubes, and forged or cast parts. Fitting 100 may be operable in high-pressure conditions, such as those associated with the pressurized product contained in the pipeline, ambient pressure associated with a deep subsea environment, or the like. For example, fitting 100 may be configured to meet selected ASME (American Society of Mechanical Engineers) standards, ANSI (American National Standards Institute) ratings, and/or ASTM (American Society for Testing and Materials) standards. In some embodiments, fitting 100 is coated with a material to increase the strength, weldability, and/or corrosion resistance of the body.

As shown in FIG. 3, fitting 100 may include passage 102. Passage 102 may be a passage through the body of fitting 100 that shapes the fitting into a longitudinal tubular. Thus, fitting 100 may be a tubular (e.g., cylindrical-shaped tubular) that includes one or more components attached to the tubular and/or one or more components located inside the tubular.

In certain embodiments, fitting 100 has a clamp structure (e.g., fitting 100 is a clamp fitting). Fitting 100 may be a two-part clamp fitting designed to be clamped around a portion of a subsea pipeline (e.g., a pipeline conduit). The subsea pipeline may be located lengthwise in passage 102 of fitting 100 when clamped inside the fitting. In certain embodiments, as shown in FIGS. 1-3, fitting 100 includes at least two body portions 104A, 104B. Body portions 104A, 104B may pivot on hinge 106, shown in FIG. 2. Body portions 104A, 104B may be coupled with hinge 106 or any other suitable coupling that allows the body portions to be closed around the subsea pipeline.

In some embodiments, fitting 100 includes additional hinges 110. Hinges 110 may be used to assist in closing and/or opening of body portions 104A, 104B of fitting 100. Hinges 110 may be hydraulic hinges or other suitable hinges that provide additional force to close or open body portions 104A, 104B. For example, hinges 110 may be similar to hinges such as described in U.S. Pat. No. 5,590,913 to Morris et al., which is incorporated by reference as if fully set forth herein. In some embodiments, hinges 110 are removable hinges. For example, hinges 110 may be removed after installation of fitting 100 on the subsea pipeline.

In certain embodiments, fitting 100 includes fasteners 112. Fasteners 112 may be located on each of the sides of fitting 100, as shown in FIG. 2. Fasteners 112 may be used to secure fitting 100 onto the subsea pipeline by securing body portions 104A, 104B together when the body portions are closed around the subsea pipeline. Fasteners 112 may be similar to and operate similarly to body studs and nuts described in U.S. Pat. No. 5,590,913 to Morris et al. In certain embodiments, fasteners 112 include bolts and nuts or other suitable fastening devices. Bolts (or studs) may pass through bores in each of body portions 104A, 104B. The bores in the body portions are aligned to allow the bolts to align the body portions together. Nuts may thread onto the bolts and be used to tighten the fasteners, thereby securing body portion 104A to body portion 104B.

In some embodiments, fitting 100 includes anodes 108, shown in FIGS. 1-3. The fitting 100 may include grips, handles, or other structures that allow a remotely operated vehicle (ROV) or another tool to hold on to, transport, and/or maneuver the fitting. Grips may be located at locations on fitting 100 that allows for easy access to the grips. Grips may have any shape that allows the ROV or another tool to easily couple to (e.g., grasp) and manipulate fitting 100. Grips may be mounted on fitting 100 or integrally formed as a part of the fitting.

In certain embodiments, fitting 100 includes collets 114, shown in FIG. 3. Collets 114 may be gripping collets. Collets 114 may include slits and/or serrations that allow the collets to engage (grip) portions of the subsea pipeline inside the collets when the collets are activated.

Collets 114, as shown in FIG. 3, are made up of semi-circular collet segments that form an annular ring when the body portions are bolted together. The shape of the collet segments may vary, however, depending on the shape of the subsea pipeline. Collets 114 may also be further segmented such that each body portion of fitting 100 employs two or more collet segments. Further segmentation of the collets may reduce or eliminate the need for slits in the collets.

In certain embodiments, collet drivers 116 are located at one or both ends of fitting 100. Collet drivers 116 may include collet drivers such as those described in U.S. Pat. No. 5,590,913 to Morris et al. Collet drivers 116 may include collet driver sleeves and collet driver flanges. Collet drivers 116 may activate collets 114. In certain embodiments, collets 114 and collet drivers 116 are annular in shape so that when body portions 104A, 104B are coupled, the collets and the collet drivers form arcuate, concentric rings. In some embodiments, collets 114 and the collet driver sleeves define a plurality of complementary inclined ramps that provide slidable engagement between the collets and the collet drivers. This slidable engagement allows the relative axial displacement of the collet driver sleeves to radially compress collets 114 to engage the subsea pipeline. Slits in collets 114 allow the collets to deform and thereby engage (grip) the subsea pipeline.

In certain embodiments, collet drivers 116 include a plurality of bores for receiving bolts or studs 118. Bolts 118 may be used to attach the collet drivers 116 to ends of fitting 100. Bolts 118 may be used to draw the collet driver sleeves toward the opposite end of each body to provide axial (lateral) pressure to the ramps of collets 114. This axial pressure forces collets 114 in a direction radially inward toward the central axis of the sleeve bore so that the collets forcibly engage (grip) the subsea pipeline.

In certain embodiments, as shown in FIG. 3, seals 120A located in body portions 104A, 104B define annular rings for sealing fitting 100 around the subsea pipeline. Seals 120A may be circumferential seals positioned in recesses in the body portions. In some embodiments, at least one of the body portions has axial (longitudinal) seals 122 on opposite sides of the body portion. Axial seals 122 may be positioned in a recess in the body portion. In some embodiments, axial seals are positioned in both body portions. Axial seals 122 may include primary axial seals that abut seals 120A and secondary axial seals outboard to the primary axial seals with the secondary axial seals abutting the outer edge of seals 120A. Seals 120A and axial seals 122 may provide a seal for fitting 100 that defines a pressure boundary when body portions 104A, 104B are coupled together. Seals 120A and axial seals 122 provide a seal in passage 102 between the outside wall of the subsea pipeline and the inside walls of body portions 104A, 104B. This seal inhibits fluid flow between the outside wall of the subsea pipeline and the inside walls of the body portions. Seals 120A and axial seals 122 may be made from an elastomeric material such as a fluoroelastomer or buna nitrile.

In certain embodiments, seals 120A are activated by one or more activation devices located on fitting 100. In certain embodiments, the activation devices include packer rings 124 and packer rods 126. Activation devices may, however, include any suitable devices known in the art that may be used to activate seals. As shown in FIG. 3, packer rings 124 may be activated by packer rods 126. Packer rings 124 may be positioned in a recess of body portions 104A, 104B proximate to seals 120A so that the packer rings are in slidable communication with the seals. Packer rods 126 may be positioned in transverse bores in the body portions with the transverse bores aligned with an end of the collet driver flanges. Packer rods 126 may be engaged (activated) when collet drivers 116 are activated. The driving force of collets 114 inward (towards the center of fitting 100) when collet drivers 116 are activated may push packer rods 126 axially, which activates packer rings 124 and seals 120A.

In certain embodiments, second seals 120B are located inwards from one set of seals 120A, as shown in FIG. 3. Second seals 120B may be circumferential seals positioned in recesses in the body portions. In some embodiments, axial seals 122 may be used in combination with second seals 120B. Second seals 120B and axial seals 122 may provide a seal that defines a second pressure boundary inside fitting 100 when body portions 104A, 104B are coupled together.

Figure 4:
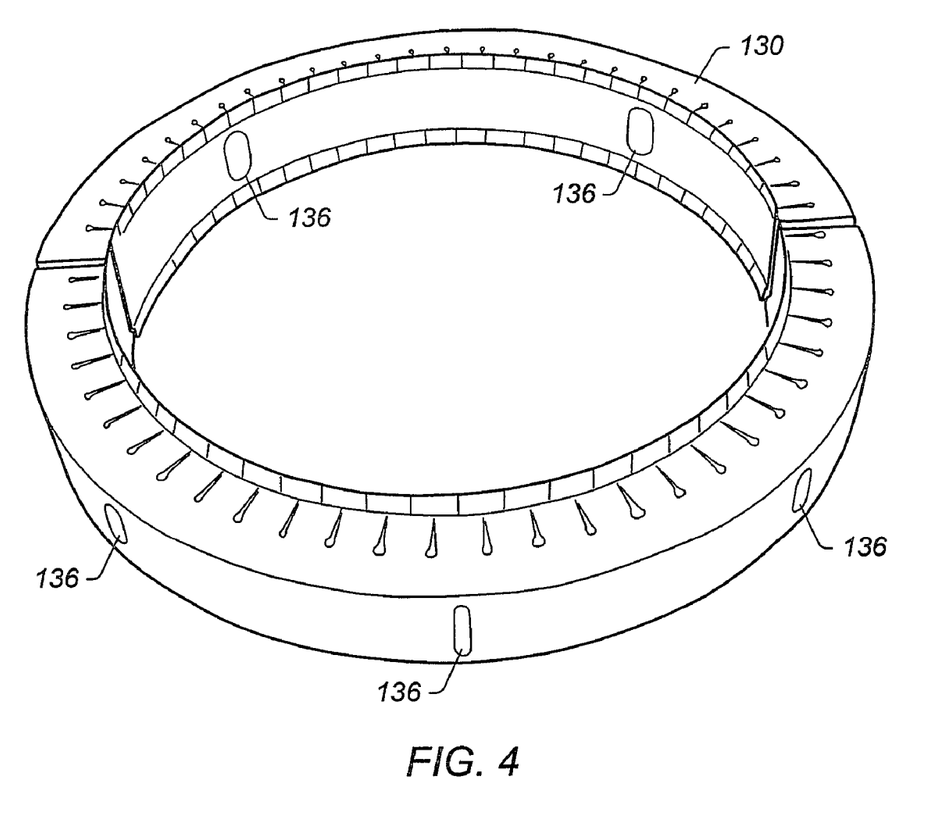
FIG. 4 depicts a perspective view of one embodiment of a ring.

In certain embodiments, ring 130 is located between second seals 120B and seals 120A. Ring 130 may be made of two semi-circular ring portions located in recesses in body portions 104A, 104B. Together the semi-circular ring portions may define ring 130. A perspective view of one embodiment of ring 130 is shown in FIG. 4. In some embodiments, ring 130 may be made of three or more ring portions. The ring 130 may include a contiguous ring (e.g., cylinder), a c-ring, a split ring, or the like.

Ring 130 may be a translatable ring that is free to translate longitudinally along the inner walls of the body portions. For example, ring 130 may be a floating separator ring. As shown in FIG. 3, ring 130 separates seals 120A from second seals 120B to define a pressure-sealed region between the seals at the ring. Ring 130 is free to move so that when seals 120A are activated by inward movement of packer rings 124, ring 130 moves to activate second seals 120B by pushing against the second seals.

In some embodiments, girder rings 128 are positioned in recesses of body portions 104A, 104B to prevent extrusion of seals 120A, 120B. Girder rings 128 may also hold seals 120A, 120B in place while fitting 100 is being installed on the subsea pipeline.

Figure 5:
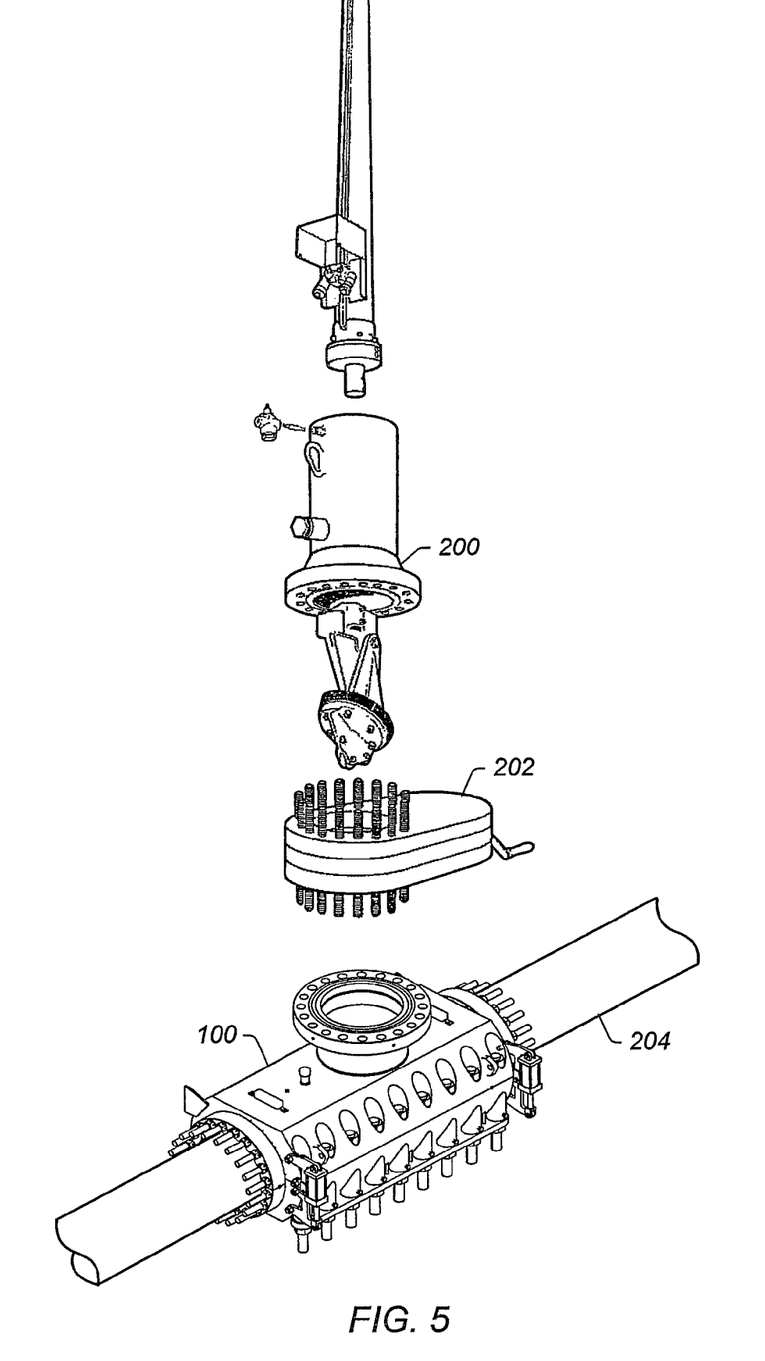
FIG. 5 depicts a typical installation diagram for a STOPPLE® plugging machine and a fitting with a sandwich valve.

In certain embodiments, fitting 100 includes port 132 and port 134. Ports 132 and 134 are in fluid communication with passage 102 inside fitting 100. In certain embodiments, port 134 has a diameter large enough to accommodate a plugging machine. Port 134 may have fittings suitable for coupling to the plugging machine or fittings suitable to any other desired use. For example, port 134 may be a 20" port with a 20" locking o-ring flange (e.g., Lock-O-Ring® available from T.D. Williams, Inc., (Tulsa, Okla.)). The plugging machine may be, for example, a STOPPLE® plugging machine available from T.D. Williamson, Inc. (Tulsa, Okla.). FIG. 5 depicts a typical installation diagram for the STOPPLE® plugging machine 200 and fitting 100 with a sandwich valve 202 on pipeline 204.

As shown in FIG. 3, hot tapping of the subsea pipeline through port 134 is possible when seals 120A and second seals 120B are activated. Hot tapping may be performed as is known in the art. Seals 120A and second seals 120B define a pressure-sealed region around port 134 so that fluid from inside subsea pipeline does not escape between the inner walls of the body portions 104A, 104B and the outer wall of the pipeline.

In certain embodiments, port 132 has a diameter smaller than port 134. For example, port 132 may have a diameter suitable for draining or adding fluids into the subsea pipeline. In an embodiment, port 132 is a 2" port. Port 132 may, however, have any diameter as needed for a desired application of fitting 100. In certain embodiments, port 132 is located in the same plane as port 134. Port 132 may, however, be offset from port 134 (e.g., rotated circumferentially) as desired. For example, port 132 may be offset by about 30°, about 90°, or about 180° from port 134.

As shown in FIG. 3, ports 132 and 134 are oriented perpendicular (90°) to passage 102. Port 132 and/or port 134 may, however, be oriented at any desired angle relative to passage 102. For example, port 132 may be oriented at a 45° angle relative to passage 102. The orientation angles and spacing of ports 132 and 134 may be designed as needed according to the application of fitting 100.

In certain embodiments, port 132 is positioned on fitting 100 so that the port is located at or near the center of ring 130. Port 132 is located at or near the center of ring 130 so that the port is located between seals 120A and second seals 120B. Port 132 is located in the pressure-sealed region defined by seals 120A and second seals 120B at ring 130. Hot tapping of the subsea pipeline through port 132 is possible when seals 120A and second seals 120B are activated.

In certain embodiments, ring 130 includes one or more openings 136, shown in FIG. 4. At least one opening 136 is aligned with port 132 so that the subsea pipeline may be hot tapped without the need for drilling through ring 130. In certain embodiments, opening 136 has an oval shape or other suitable shape that provides clearance around port 132 so that the opening remains aligned with the port after ring 130 moves.

The pressure-sealed region around port 132 is separate from the pressure-sealed region around port 134 so that there are two isolated pressure-sealed regions inside fitting 100. Thus, the pressure on port 132 is isolated from the pressure on port 134.

Isolation of the pressure of port 132 from the pressure of port 134 allows port 132 to be used as a drain/equalization port when port 134 is used as a plugging port. Port 132 may be located downstream from port 134 (fluid flows right to left in FIG. 3). When fitting 100 is coupled to the subsea pipeline, hot taps may be made through both ports 132 and 134. After the pipeline is plugged through port 134, fluid downstream of the plugging head is drained through port 132. In some embodiments, another fitting (e.g., fitting 100) may be used downstream to create a pressure-isolated section of pipeline for draining between the two fittings. Maintenance and/or repairs may be made to the drained portion of the pipeline downstream of fitting 100. After maintenance and/or repairs are made, port 132 may be used to re-energize (re-pressurize) the drained portion of pipeline so that pressure in the downstream section is equalized with pressure upstream of the stopple and the plugging head can be removed from the pipeline to resume flow through the pipeline.

Using fitting 100 for both plugging and draining/pressure-equalization in a single fitting may reduce the number of installations versus installing separate draining/pressure-equalization and plugging fittings. The elimination of the use of separate fittings may reduce the cost of the equipment and significantly reduce the time required for installation.

In some embodiments, two or more ports 132 are located on fitting 100. Ports 132 may be located on the same side of port 134 and/or on opposing sides of port 134. In such embodiments, multiple groups of seals 120A, seals 120B, and rings 130 are used to define isolated pressure-sealed regions around each of the ports located on fitting 100.

Figure 6:
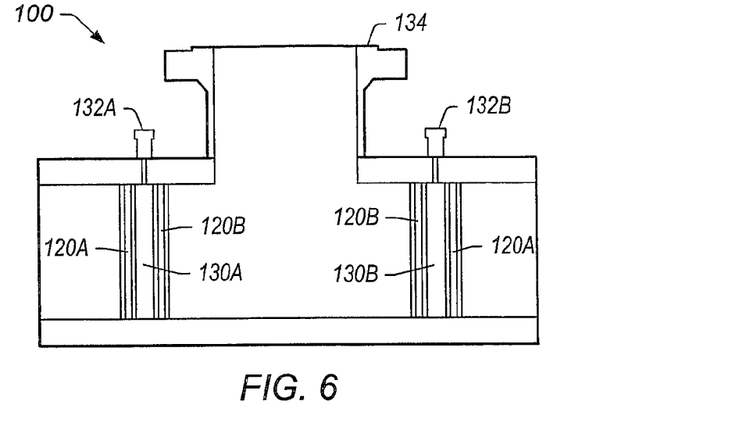
FIG. 6 depicts an embodiment of a fitting with three pressure-isolated ports.
Figure 7:
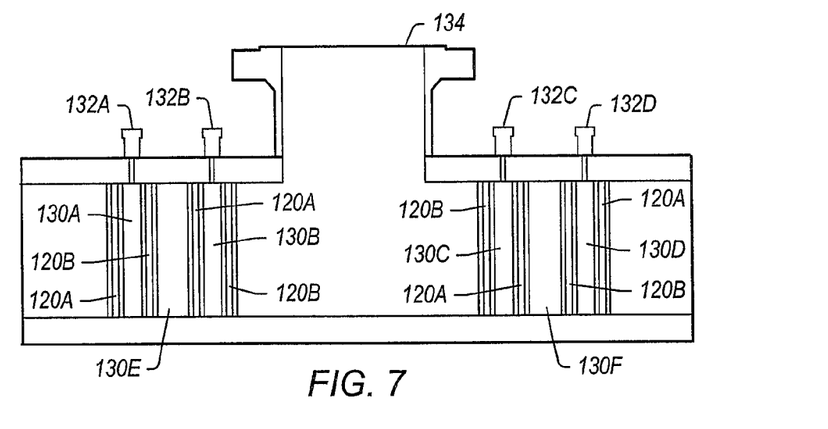
FIG. 7 depicts an embodiment of a fitting with a plurality of pressure-isolated ports.
Figure 8:
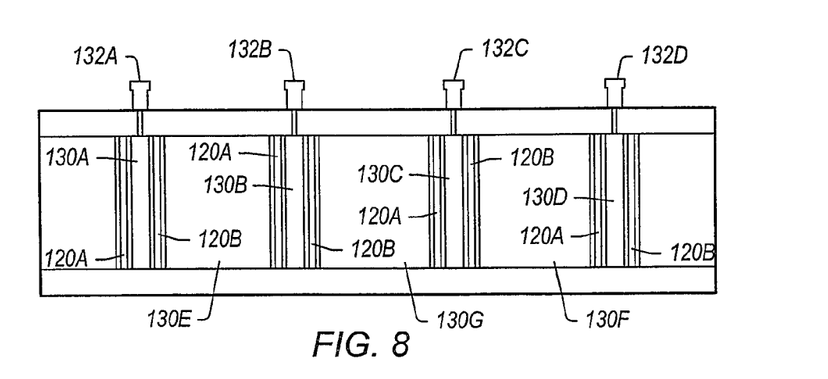
FIG. 8 depicts an embodiment of a fitting with a plurality of pressure-isolated ports separated by rings.

FIG. 6 depicts an embodiment of fitting 100 with three pressure-isolated ports 132A, 132B, and 134. FIG. 7 depicts an embodiment of fitting 100 with a plurality of pressure-isolated ports 132A, 132B, 132C, 132D, and 134. FIG. 8 depicts an embodiment of fitting 100 with a plurality of pressure-isolated ports 132A, 132B, 132C, and 132D separated by rings. For the purposes of simplicity, many of the detailed components depicted in FIGS. 1-3 have been omitted from FIGS. 6-8. For example, components such as activation devices (e.g., collets and collet drivers), fasteners, and bolts as well as cross-sectional markings have been omitted from FIGS. 6-8. It is to be understood that these details components may be used as needed in the embodiment of fitting 100 depicted in FIGS. 6-8.

As shown in FIG. 6, ports 132A, 132B may be located on opposing sides of port 134. Having ports 132A, 132B on opposing sides of port 134 may provide fitting 100 with more versatility and/or a higher tolerance for operator error. For example, with ports 132A, 132B on both sides of port 134, fitting 100 may be installed in either direction without a requirement of a single port being installed on the correct (downstream or upstream) side of the fitting.

In certain embodiments, ports 132A, 132B are located in the same plane as port 134. Ports 132A, 132B may, however, be offset from port 134 (e.g., rotated circumferentially) as desired. Ports 132A, 132B may be either in the same plane as each other or in different planes, as desired.

As shown in FIG. 6, ring 130A and ring 130B, along with seals 120A, 120B, may define separate pressure-sealed regions around port 132A and port 132B, respectively. A third, separate pressure-sealed region may be defined around port 134 between the sets of seals 120B on each side of the port. In certain embodiments, seals 120A, 120B and ring 130A proximate port 132A are activated using activation devices coupled to a first end (the left end) of fitting 100 while seals 120A, 120B and ring 130B proximate port 132B are activated using activation devices coupled to a second end (the right end) of the fitting. The seals may be activated at the same time or some seals may be active while other seals are not active. In other words, the seals may be activated independent of one another. For example, the seals 120A, 120B proximate port 132A may be active and the seals 120A, 120B proximate port 132B may not be active, or vice-versa.

FIG. 7 depicts two ports 132A, 132B located on an opposing side of port 134 from two ports 132C, 132D on fitting 100. Ports 132A, 132B, 132C, and 132D may be of the same size or differing sizes depending on a desired use of fitting 100. Rings 130A, 130B, 130C, and 130D, along with seals 120A, 120B, define separate pressure-sealed regions around ports 132A, 132B, 132C, and 132D, respectively. A separate pressure-sealed region may be defined around port 134 between the sets of seals 120B on each side of the port. The seals may be activated at the same time or some seals may be active while other seals are not active. In other words, the seals may be activated independent of one another. For example, the seals 120A, 120B proximate the ports 132A, 132B on one side of port 134 may be active and the seals 120A, 120B proximate the ports 132C, 132D on the opposite side of the port 134 may not be active, or vice-versa.

In certain embodiments, seals 120A, 120B and ring 130A proximate port 132A are activated using activation devices coupled to a first end (the left end) of fitting 100. Activation of the seals and ring proximate port 132A is translated to activate the seals and ring (seals 120A, 120B and ring 130B) proximate port 132B because of the presence of ring 130E. Ring 130E is free to move so that when seals 120B on the left side of the ring are activated by the activation device (and the corresponding movement of seals 120A and ring 130A proximate port 132A), the ring moves to activate seals 120A on the right side of the ring by pushing against the seals.

Seals 120A, 120B and ring 130D proximate port 132D are activated using activation devices coupled to a second end (the right end) of the fitting. Activation of the seals and ring proximate port 132D is translated to activate the seals and ring (seals 120A, 120B and ring 130C) proximate port 132C because of the presence of ring 130F. Ring 130F is free to move so that when seals 120B on the right side of the ring are activated by the activation device (and the corresponding movement of seals 120A and ring 130A proximate port 132D), the ring moves to activate seals 120A on the left side of the ring by pushing against seals.

FIG. 8 depicts an embodiment of fitting 100 with a plurality of pressure-isolated ports 132A, 132B, 132C, 132D separated by rings that can be activated using one activation device. Rings 130A, 130B, 130C, and 130D, along with seals 120A, 120B, define separate pressure-sealed regions around ports 132A, 132B, 132C, and 132D, respectively. The pressure-sealed regions are separated by rings 130E, 130G, and 130F (left to right in FIG. 8).

In certain embodiments, all seals 120A, 120B are activated using one activation device coupled to fitting 100. For example, the activation device may be coupled to the left end of fitting 100 so that the activation device directly activates seals 120A proximate port 132A. Ring 130A is activated by activation of seals 120A and translates to activate seals 120B. Activation of seals 120B activates ring 130E that spans the gap to seals 120A proximate port 132B. Similarly, activation of seal 120B proximate port 132B activates ring 130G, thereby translating ring 130G and activating the seals proximate port 132C and ring 130F. Activating the ring 130F operates to translate and activate the seals proximate port 132D. Thus, the one activation device is able to activate all seals 120A, 120B located inside fitting 100 (e.g., activate each of the seals 120A, 120B proximate the ports 132A, 132B, 132C and 132D).

Fitting 100, as shown in FIG. 8, may reduce costs associated with installation (such as operator time) as only one activation device is needed to activate the seals and secure the fitting to the subsea pipeline. It is to be understood that the use of one activation device, as shown in FIG. 8, is possible in any of the embodiments described herein (for example, the embodiments depicted in FIGS. 1-3, 6, and 7). Further, other embodiments may include the use of a single activation device to activate any number of seals (e.g., two or more seals). A ring, such as rings 130E, 130F, 130G shown in FIG. 8, may be used in any embodiment described herein to span a gap between seals in fitting 100 so that activation of seals on one side of the ring activate seals on the other side of the ring. In some embodiments, the ring includes an opening that is shaped and sized to allow access to the subsea pipeline through a port proximate the ring so that the subsea pipeline may be hot tapped without the need for drilling through ring.

For example, in the embodiment depicted in FIG. 6, a ring may be used to span the gap between seals 120B on each side of port 134. The ring may have an opening that allows access to the subsea pipeline through port 134 without drilling through the ring. The ring may move to activate seals proximate port 132B when seals proximate port 132A are activate using an activation device coupled to the left side of the fitting.

Figure 9:
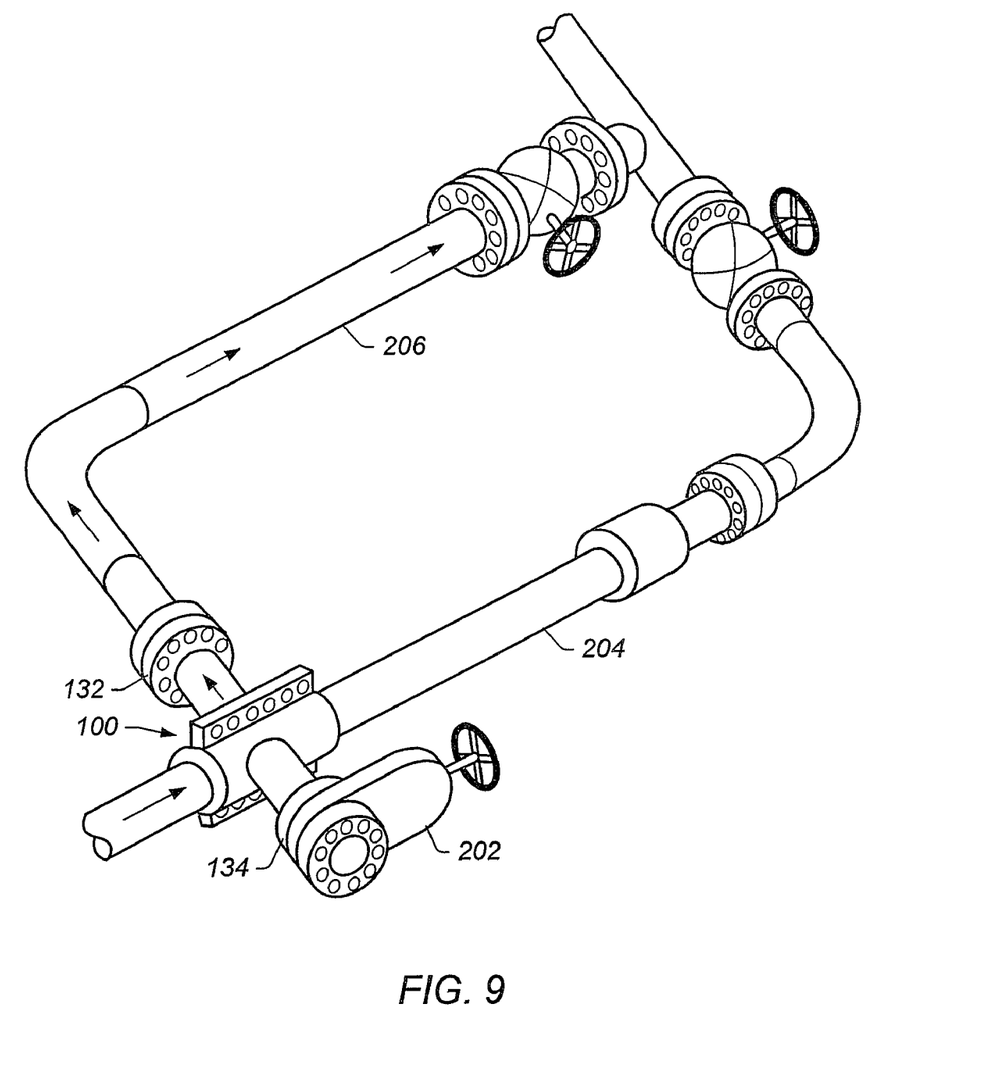
FIG. 9 depicts an embodiment of a subsea pipeline with a bypass line.

FIG. 9 depicts an embodiment of subsea pipeline 204 with bypass line 206. Fitting 100 is a bypass/plugging fitting on subsea pipeline 204. Fitting 100 may be used to allow access for a plugging head into pipeline 204 while diverting flow into bypass line 206. Valve 202 may open/close flow into bypass line 206. Using fitting 100 on pipeline 204 may eliminate the need for separate bypass and plugging fittings on the pipeline. Thus, equipment and installation costs may be greatly reduced by using fitting 100.

Figure 10:
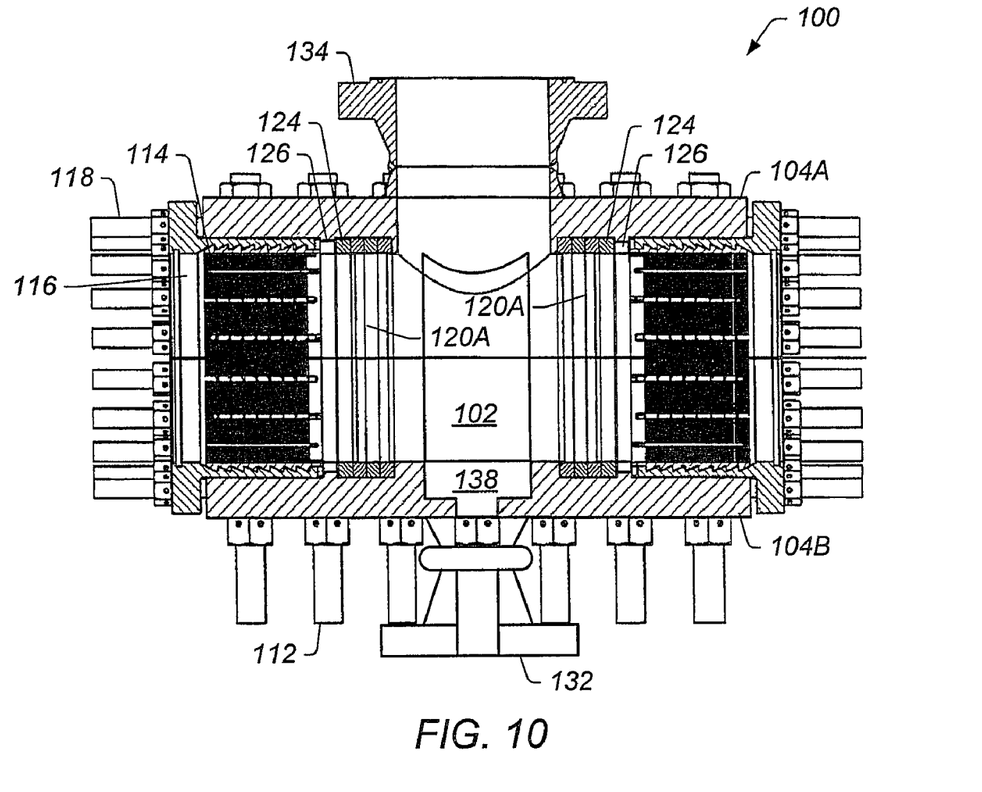
FIG. 10 depicts an alternative embodiment of a fitting that may be used as a bypass/plugging fitting.

FIG. 10 depicts an alternative embodiment of fitting 100 that may be used as a bypass/plugging fitting. Port 132 and port 134 are in fluid communication with passage 102 and each other (e.g., the ports share the same pressure-sealed region defined between seals 120A). In an embodiment, port 134 is sized for use as a plugging port (e.g., the port is sized to allow a plugging head to be inserted through the port). For example, port 134 may be a 20" port coupled to a 20" locking o-ring flange. The subsea pipeline may be hot tapped through port 134 to allow the plugging head to be inserted into the pipeline.

When the plugging head plugs flow in the pipeline, channel 138 allows fluids from inside the pipeline to flow circumferentially around the outside of the pipeline from the hot tap near port 134 to the port 132 through the channel. Channel 138 may be a channel formed in body portions 104A, 104B of fitting 100 between the port 132 and port 134. The size and shape of channel 138 may be adjusted to provide desired flow characteristics in fitting 100 between port 132 and port 134. Port 132 may be coupled to the bypass line, as shown in FIG. 9. In an embodiment, port 132 is a 12" port coupled to a 12" bypass locking o-ring flange.

The embodiment as shown in FIG. 10 does not include any rings 130 or second seals 120B (as shown in FIGS. 3 and 6-8) as there is only one pressure-sealed region located in fitting 100. It is to be understood that fitting 100, as shown in FIG. 10, may be modified to include rings and/or second seals as desired or needed depending on an application of fitting 100. For example, a ring may be used to span the gap between seals 120A, shown in FIG. 10, so that the seals can be activated using an activation device (e.g., packer rings and packer rods) located on only one end of fitting 100. As another example, an additional port may be located on fitting 100, as shown in FIG. 10, to be used as a drain/equalization port. The additional port may have a separate pressure-sealed region defined using a ring and second seals, as shown in FIGS. 3 and 6-8.

Figure 11:
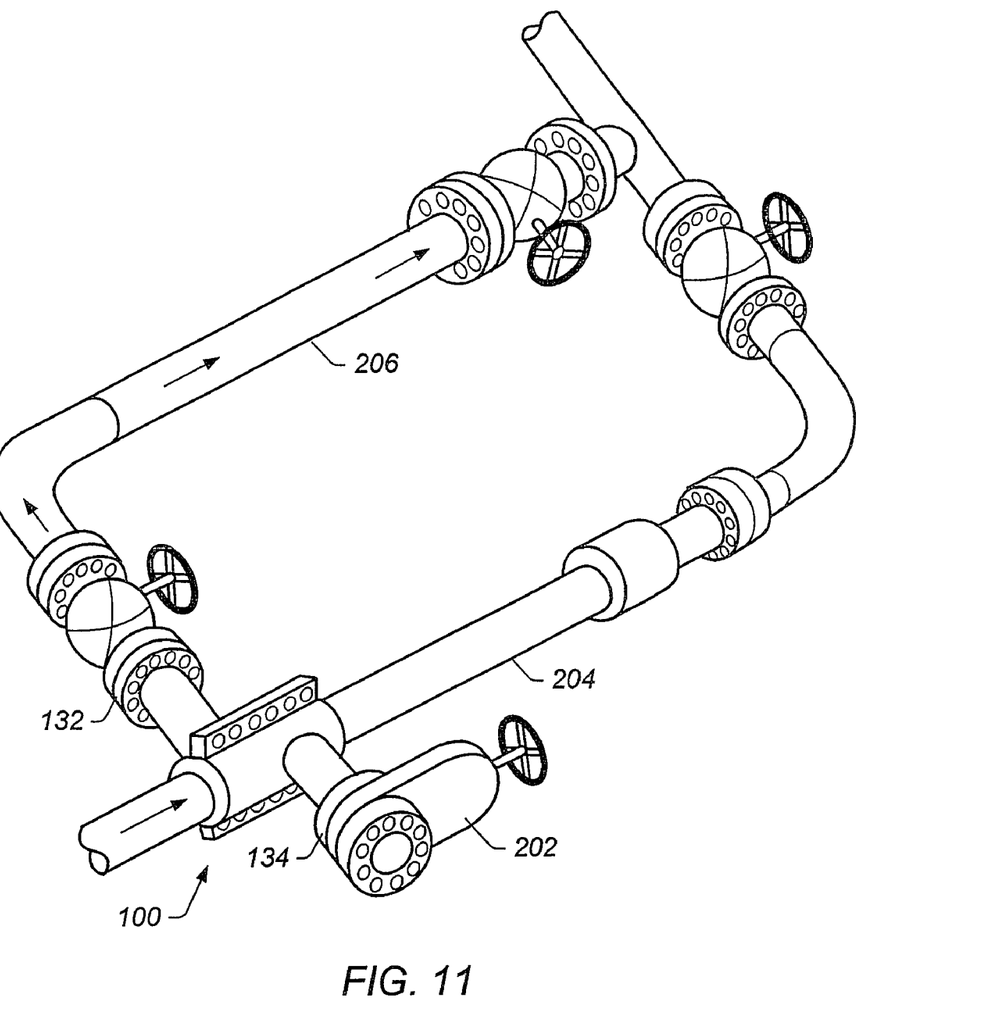
FIG. 11 depicts an embodiment of a fitting with offset ports.

In some embodiments, ports 132 and 134 may be offset. FIG. 11 depicts an embodiment of fitting 100 with offset ports 132 and 134. Access to the pipeline through port 132 (the bypass line port) may be achieved in a variety of ways. In one embodiment, a channel (similar to channel 138 depicted in FIG. 10) may provide fluid communication between ports 132 and 134 so that fluids leaving the pipeline through the hot tap proximate port 134 are allowed to flow to port 132 through the channel. In another embodiment, ports 132 and 134 may have separate pressure-sealed regions defined by seals and rings inside fitting 100 (similar to the embodiment depicted in FIG. 3). Access to the bypass line may be achieved by hot tapping into the pipeline through port 132. Thus, when the plugging head is inserted through port 134, fluids are directed out through port 132 when a valve coupled to the port is opened.

In certain embodiments, fitting 100 is used as a clamp fitting. Fitting 100 may be used to clamp around a section of subsea pipeline that is damaged or needs the outer diameter of the pipeline to be sealed. For example, fitting 100 may be used to clamp around and seal off a leaking portion of pipeline.

Figure 12:
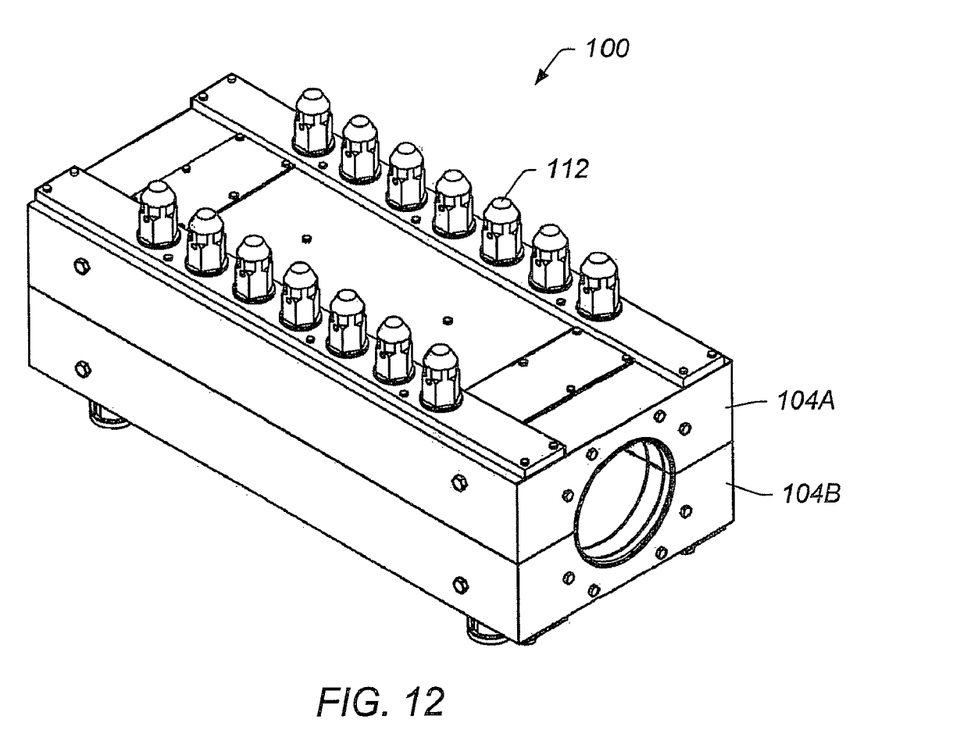
FIG. 12 depicts an isometric view of an embodiment of a fitting used as a clamp fitting.
Figure 13:
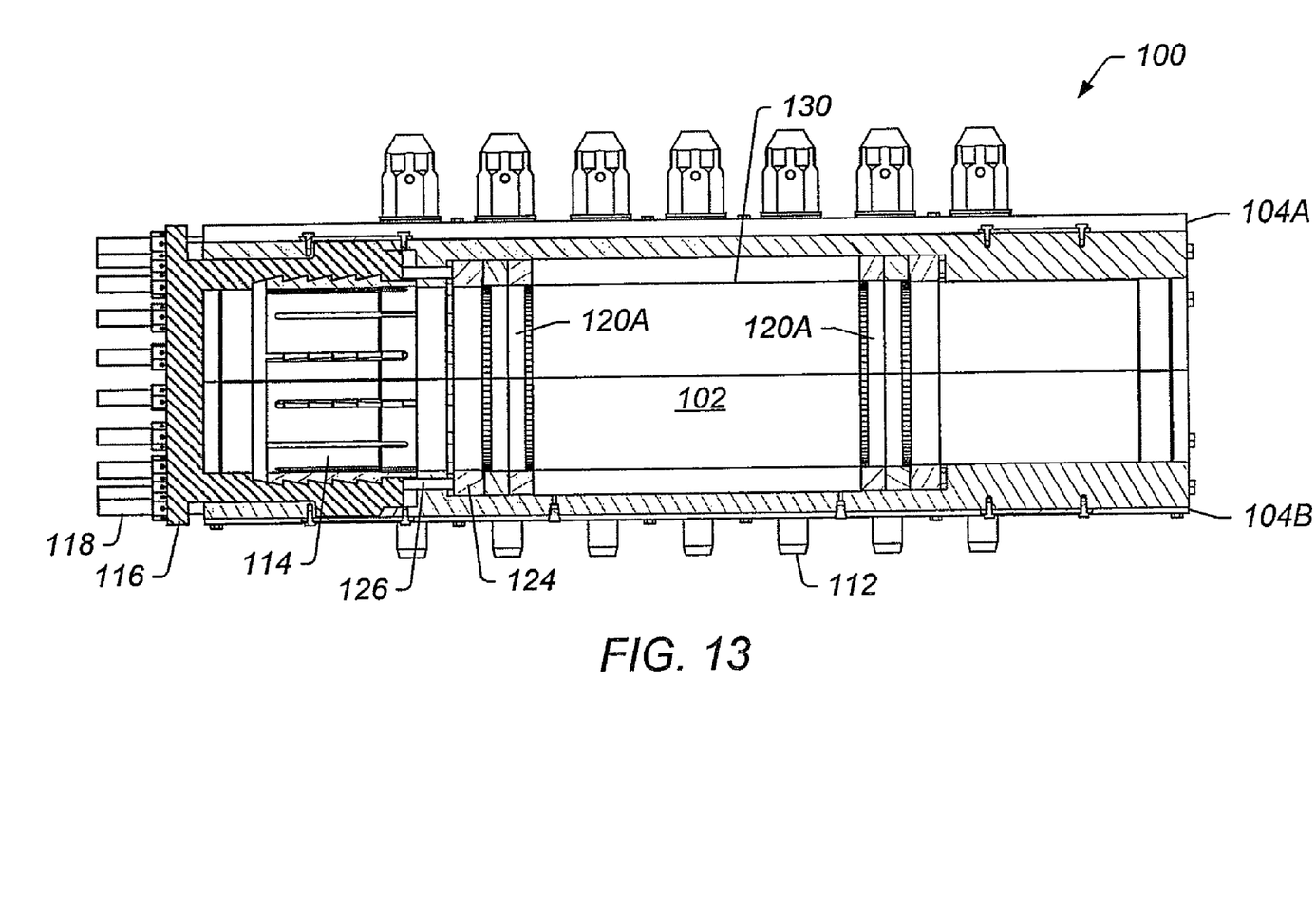
FIG. 13 depicts a cross-sectional view of an embodiment of a fitting used as a clamp fitting.

FIG. 12 depicts an isometric view of an embodiment of fitting 100 used as a clamp fitting. FIG. 13 depicts a cross-sectional view of fitting 100 used as a clamp fitting. Body portions 104A, 104B form a tightly sealed enclosed space when the portions are coupled together using fasteners 112. Activation devices (e.g., packer rings 124 and packer rods 126) are located on one end of fitting 100. The activation devices are used to activate seals 120A. Ring 130 moves so that seals 120A on both sides of the ring are activated when the activation devices are activated. In some embodiments, additional seals and/or rings are used to provide increased pressure sealing inside fitting 100. Having only one activation device on fitting 100 reduces the number of activation devices to be operated by an operator and reduces the time for installing the fitting on the pipeline.

Seals 120A, as shown in FIG. 13, define a pressure-sealed region in passage 102 between the seals. The pressure-sealed region is approximately the span of ring 130. When fitting 100 is placed on the subsea pipeline, the fitting is located on the pipeline so that the portion of the pipeline desired to be pressure-sealed is located within the space defined by ring 130. For example, fitting 100 may be placed on the pipeline so that a leak in the pipeline is at or near the center of ring 130.

In some embodiments, one or more ports may be located on fitting 100 to pressure test seals 120A and/or to allow access to the passage of fitting (e.g., hot tapping), if needed. In such embodiments, ring 130 includes one or more openings aligned with the ports to allow access to passage 102 and/or the pipeline without the need for drilling through the ring. In some embodiments, collets 114 and collet drivers 116 are not used in fitting 100. In such embodiments, packer rings 124 and packer rods 126 may be directly activated using bolts 118.

In certain embodiments described herein, fitting 100 is maneuvered, installed, manipulated, and/or operated using a remotely operated vehicle (ROV), a hydraulic or pneumatic actuator, or human operator. Fitting 100 may be specifically used in subsea applications that are difficult, dangerous, and/or costly for human operation.

It is to be understood the invention is not limited to particular systems described which may, of course, vary. It is also to be understood that the terminology used herein is for the purpose of describing particular embodiments only, and is not intended to be limiting. As used in this specification, the singular forms "a", "an" and "the" include plural referents unless the content clearly indicates otherwise. Thus, for example, reference to "a seal" includes a combination of two or more seals.

In this patent, certain U.S. patents, U.S. patent applications, and other materials (e.g., articles) have been incorporated by reference. The text of such U.S. patents, U.S. patent applications, and other materials is, however, only incorporated by reference to the extent that no conflict exists between such text and the other statements and drawings set forth herein. In the event of such conflict, then any such conflicting text in such incorporated by reference U.S. patents, U.S. patent applications, and other materials is specifically not incorporated by reference in this patent.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A method of plugging and draining a portion of a subsea pipeline, comprising:
    coupling together at least two body portions to form a body having a passage through the body, the passage at least partially surrounding at least a portion of the subsea pipeline at least substantially lengthwise within the body;
    securing the body to the subsea pipeline;
    activating a first seal located on the passage wall between a first end of the body and a first port located on the body, the first port being in fluid communication with the passage;
    activating a second seal located on the passage wall between the first port and a second port located on the body, the second port being in fluid communication with the passage, wherein activating the second seal comprises translating a ring located on the passage wall between the first and second seals, wherein translating the ring comprises moving the ring along the passage wall when the first seal is activated so that the second seal is activated;
    tapping into the subsea pipeline through the second port;
    plugging flow in the subsea pipeline with a plugging head inserted through the second port; and
    removing fluids from the subsea pipeline through the first port.

2. The method of claim 1, wherein activating the first and/or second seals provides a seal in the passage between the outside wall of the conduit and the inside wall of the body.

3. The method of claim 1, wherein the ring comprises an opening proximate the first port configured to provide access to the subsea pipeline through the first port.

4. The method of claim 1, further comprising removing fluids downstream of the plugging head.

5. The method of claim 1, further comprising plugging a second portion of the subsea pipeline downstream of the plugging head prior to removing fluids from the subsea pipeline.

6. The method of claim 1, further comprising activating the seals using at least one activation device coupled to the body.

7. The method of claim 1, further comprising activating a third seal located between the second port and a second end of the body.

8. The method of claim 1, further comprising providing fluids into the subsea pipeline through the first port after maintenance and/or repair of the subsea pipeline.

9. The method of claim 1, further comprising performing the method in a subsea environment.

10. The method of claim 1, further comprising performing the method in a subsea environment using an ROV.

11. The method of claim 1, wherein the body is substantially cylindrical in shape.

12. The method of claim 1, wherein the passage is substantially tubular in shape.

13. The method of claim 1, wherein tapping comprises hot tapping.

14. A method of plugging and draining a portion of a subsea pipeline, comprising:
   coupling together at least two body portions to form a body having a passage through the body, the passage at least partially surrounding at least a portion of the subsea pipeline at least substantially lengthwise within the body;
   securing the body to the subsea pipeline;
   activating a first seal located on the passage wall between a first end of the body and a first port located on the body, the first port being in fluid communication with the passage;
   translating a ring located on the passage wall between the first seal and a second seal to activate the second seal, wherein the ring is translated along the passage wall during activation of the first seal, and wherein the second seal is located on the passage wall between the first port and a second port located on the body, the second port being in fluid communication with the passage; and
   tapping into the subsea pipeline through the second port.

15. The method of claim 14, further comprising plugging flow in the subsea pipeline with a plugging head inserted through the second port.

16. The method of claim 14, further comprising removing fluids from the subsea pipeline through the first port.

17. The method of claim 14, further comprising performing the method in a subsea environment.

18. A method of plugging and draining a portion of a subsea pipeline, comprising:
   coupling together at least two body portions to form a body having a passage through the body, the passage at least partially surrounding at least a portion of the subsea pipeline at least substantially lengthwise within the body;
   securing the body to the subsea pipeline;
   activating a first seal located on the passage wall between a first end of the body and a first port located on the body, wherein activation of the first seal activates a second seal located on the passage wall between the first port and a second port located on the body by moving a ring located between the first seal and the second seal towards the second seal, and wherein the first port and the second port are in fluid communication with the passage, and
   tapping into the subsea pipeline through the second port.

19. The method of claim 18, further comprising plugging flow in the subsea pipeline with a plugging head inserted through the second port.

20. The method of claim 18, further comprising removing fluids from the subsea pipeline through the first port.

* * * * *